United States Patent
Towe (10) Patent No.: US 10,393,407 B1
(45) Date of Patent: Aug. 27, 2019

(54) HEAT TRANSFER AND THERMAL STORAGE APPARATUS

(71) Applicant: Orenko Limited, Cambridge (GB)

(72) Inventor: Elias Towe, Pittsburgh, PA (US)

(73) Assignee: Orenko Limited, Cambridge (GB)

(*) Notice: Subject to any disclaimer, the term of this patent is extended or adjusted under 35 U.S.C. 154(b) by 0 days.

(21) Appl. No.: 16/163,131

(22) Filed: Oct. 17, 2018

(51) Int. Cl.
| | |
|---|---|
| *F24S 80/20* | (2018.01) |
| *F03G 6/06* | (2006.01) |
| *F03G 6/00* | (2006.01) |
| *F24S 10/70* | (2018.01) |
| *F21V 8/00* | (2006.01) |
| *F24S 60/00* | (2018.01) |
| *F24S 23/71* | (2018.01) |

(52) U.S. Cl.
CPC ............... *F24S 80/20* (2018.05); *F03G 6/00* (2013.01); *F03G 6/003* (2013.01); *F03G 6/005* (2013.01); *F03G 6/06* (2013.01); *F03G 6/065* (2013.01); *F03G 6/067* (2013.01); *F24S 10/70* (2018.05); *F24S 23/71* (2018.05); *F24S 60/00* (2018.05); *G02B 6/0008* (2013.01); *F03G 2006/062* (2013.01)

(58) Field of Classification Search
CPC .. F24S 80/20; F24S 23/71; F24S 10/70; F24S 60/00; F03G 6/003; F03G 6/06; F03G 6/005; F03G 6/00; F03G 6/067; F03G 6/065; F03G 2006/062; G02B 6/0008
USPC ............................................ 60/641.8–641.15
See application file for complete search history.

(56) References Cited

U.S. PATENT DOCUMENTS

| | | | |
|---|---|---|---|
| 3,780,722 A | 12/1973 | Swet | |
| 4,433,199 A | 2/1984 | Middy | |
| 6,464,383 B1* | 10/2002 | Northington | .......... A61B 90/35 362/572 |
| 6,601,985 B1* | 8/2003 | Jesurun | ...................... F21S 2/00 362/552 |
| 2002/0148497 A1 | 10/2002 | Sasaoka et al. | |
| 2006/0067089 A1* | 3/2006 | Hocquard | ............... A47F 3/001 362/576 |
| 2008/0271776 A1 | 11/2008 | Morgan | |
| 2008/0277565 A1 | 11/2008 | Bookbinder et al. | |
| 2009/0064993 A1 | 3/2009 | Ghosh et al. | |
| 2009/0107541 A1 | 4/2009 | Linke et al. | |
| 2010/0116319 A1 | 5/2010 | Martinez Anton et al. | |
| 2010/0139765 A1 | 6/2010 | Mapel | |
| 2010/0212717 A1 | 8/2010 | Whitlock et al. | |
| 2011/0232211 A1 | 9/2011 | Farahi | |

(Continued)

FOREIGN PATENT DOCUMENTS

| | | |
|---|---|---|
| CA | 2564835 | 4/2008 |
| DE | 2631194 | 2/1978 |

(Continued)

*Primary Examiner* — Hoang M Nguyen
(74) *Attorney, Agent, or Firm* — BrainwoodHuang (57) ABSTRACT

Thermal energy is derived from sunlight. The system has a heating surface arranged to support microparticles to be heated, and a group of optical-fibers arranged to transport sunlight to irradiate microparticles on the heating surface. The optical-fibers are moved relative to the heating surface to enable the microparticles to be heated by the transported light as the optical-fiber scans the microparticles.
Apparatus for storing the heated particles and for using the thermal energy is also discussed.

23 Claims, 4 Drawing Sheets

(56) References Cited

U.S. PATENT DOCUMENTS

| | | | |
|---|---|---|---|
| 2013/0104979 | A1 | 5/2013 | Huang |
| 2014/0202522 | A1 | 7/2014 | Nunez Bootello et al. |
| 2015/0034144 | A1 | 2/2015 | Stone et al. |
| 2015/0125113 | A1 | 5/2015 | Schreiber et al. |
| 2017/0290498 | A1* | 10/2017 | Tamura .............. A61B 1/00096 |
| 2017/0363271 | A1* | 12/2017 | Igari ........................ G02B 6/00 |

FOREIGN PATENT DOCUMENTS

| | | |
|---|---|---|
| EP | 2204606 | 7/2010 |
| FR | 2310308 | 12/1976 |
| RU | 102747 | 3/2011 |
| WO | 2018119994 | 7/2018 |

* cited by examiner

HEAT TRANSFER AND THERMAL STORAGE APPARATUS

FIELD

This invention is in the field of solar energy storage.

BACKGROUND

Storage of solar energy remains a challenge that has not yet been satisfactorily resolved. This is a pivotal problem because long-term viability of solar energy requires storage. While the sun could potentially provide most of the energy the world needs, the fact that it is only available when there is sunlight makes the sun an inconvenient and unreliable source of energy. Finding a reliable and an effective way to store energy from the sun is important because the sun is the most abundant and cleanest source of energy available to humanity. An effective storage solution for solar energy would reduce reliance on fossil fuel sources—thus reducing the harmful effects of these fuels on the environment and from contributing to climate change.

The simplest approach to storing solar energy today is to charge banks of batteries with electrons (charge) liberated during the photovoltaic process. This approach, however, is limited by the amount of charge that can be stored in the battery, the spontaneous and unavoidable discharge of it, and by the relatively short charge retention period of the battery. In general, only a limited number of low power applications can rely entirely on battery storage; and even then, the batteries must be periodically recharged. Furthermore, the current chemistry of batteries is environmentally unsafe and not sustainable. Some batteries, for example those that include reactive alkali elements such as lithium, potassium, or sodium in them, can explode if not properly packaged. The very properties that make them ideal as elements of energy storage devices, also make them dangerous. Disposal of used batteries is often problematic because of the chemical toxicity of the waste.

Although several other methods have been investigated for solar energy storage, the most viable for large-scale storage usually take one of two paths to achieving sensible heat storage—where conversion of solar energy to thermal energy leads to a temperature difference between the thermal storage medium that receives it and the ambient. In one alternative of the process, a solar energy collection loop and a storage loop are usually set up. The collection loop may be comprised of an apparatus that harvests solar energy with a receiver that has a fluid to which the energy is transferred; this fluid flows in a closed loop established between the receiver and a heat exchanger. A second fluid flows in another loop that connects the same heat exchanger and a storage vessel filled with a large volume of a second fluid. The two fluids do not touch or mix but exchange energy through the heat exchanger. In this kind of system, thermal energy delivered to the receiver is absorbed by the first fluid and then transferred to the second through the heat exchanger; the large volume of the second fluid serves as the storage medium. The fluid in the storage vessel usually has a high thermal capacity; molten salt, among several others, is usually a good choice. Properly insulated salt can retain (store) heat for long periods. Thermal energy stored in this manner can be used to convert water to supersaturated steam, which can drive a turbine to generate electricity.

In the second alternative path for storing sensible heat, the first loop in the system containing heat transfer fluid is eliminated. Instead, salt is directly used to absorb the solar energy at the receiver. The salt therefore serves both as the heat transfer fluid as well as the storage medium. Elimination of the heat transfer fluid improves overall efficiency of the power generation process since losses at the first heat exchanger, which is no longer needed, are avoided.

Today, there are a number of solar energy plants installed across the world that utilize molten salt thermal storage to augment generation capacity when there is no sun. These plants are based on concentrated solar power (CSP), where sunlight is first concentrated at a receiver through which a heat-transfer fluid of one kind or another is flowing. Heat from such plants can be utilized directly to generate electricity as previously described. The process can be carried out in real time when the sun is still up or it can be performed after hours by using stored heat. In either case, CSP plants can be more efficient than photovoltaic power plants. The downside of CSP plants augmented with molten salt storage is that salt is corrosive. Storage vessels, piping, and any components made from metal parts are susceptible to corrosion. The damage incurred leads to frequent repairs, and to increased maintenance costs. Furthermore, because of high initial investment required to construct the infrastructure of a CSP plant, these systems only make economic sense if they are owned by large-scale utility plant operators.

Recently, microparticles have been proposed and investigated as possible heat transfer or storage media, for example in the following references.

1. Z. Ma, M. Mehos, G. Glatzmaier, and B. B. Sakadjian, "Development of solid particle thermal energy storage for concentrating solar power plants that use fluidized bed technology," Energy Procedia, 69 1349-1359, (2015).
2. C. K. Ho, J. Christian, J. Yellowhair, S. Jeter, M. Golob, C. Nguyen, K. Repole, S. Abdel-Khalik, N. Siegel, H. Al-Ansary, A. El-Leathy, and B. Gobereit, "Highlights of the high-temperature falling particle receiver project: 2012-2016," AIP Conference Proceedings, 1850 030027 (2017).
3. Z. Ma and R. Zhang, "Solid particle thermal energy storage design for fluidized-bed concentrated solar power plant", US Patent Application, US 2013.0255667 A1, Oct. 3, 2013.

Until now, all previous work reported on use of such microparticles for heat transfer or storage has exclusively relied on high tower solar receiver architectures generally used in CSP systems. In this type of architecture, a solar field full of mirrors surrounds a tall tower, on top of which is located a receiver; the mirrors are situated in such a way that collected sunlight is directed and focused onto the elevated receiver in the tower where a heat transfer fluid is flowing, as previously described. When microparticles are substituted for the heat transfer fluid, a thin sheet of such particles is caused to fall by gravity across the receiver aperture. At the instant that the particles are falling through the aperture, they are exposed to the intense concentrated sunlight that is focused there; they absorb the thermal energy and, when they reach the bottom of the tower, are retrieved and stored. It is in this manner that heat transfer and storage are accomplished. To date, there are no installed commercial systems based on this approach. Despite limitations associated with fluid media and current difficulties with microparticles, thermal energy storage in the form of sensible heat has potential to offer a solution around solar intermittence. What is required is a robust and low-cost method that does not use thermal fluids, but overcomes the difficulties associated with the microparticles.

SUMMARY

According to an aspect of the invention there is provided a thermal energy storage system comprising: a heating surface arranged to support microparticles to be heated; at least one optical-fiber arranged to transport light to illuminate the heating surface; and means for causing relative movement between the at least one optical-fiber and the at least one heating surface to enable the microparticles to be heated by the transported light as the at least one optical-fiber scans the microparticles.

Instead of using a fluid as the storage medium, embodiments of the invention provide a scheme wherein solid matter is the storage medium. The implementation utilizes microstructured solid-state particles, selected for their high thermal absorption and low emissivity properties. High absorption means the particles can be rapidly heated to very high temperatures, and if they are of low emissivity, they can retain the heat for a reasonably long time. However, the scheme also addresses problems with existing proposals for the use of microparticles. Such a scheme is described in the following. Embodiments of the following invention enable a potentially inexpensive, and sustainable, solution.

One of the major difficulties with existing systems has been accumulating a large volume of particles that is sufficiently hot at the bottom of the tower. This inadequacy is due to the relatively short residence time that the particles spend in the hot aperture region of the receiver; the interval is too short for a large volume of particles to absorb a large amount of thermal energy. Therefore, realizable particle temperatures are not high enough to be useful. Particle recirculation has been considered and attempted in some experiments to increase the temperature; however, there are many implementation difficulties associated with the prior art architecture. Some of them are technological, while others are fundamental.

As will become evident from the following, the approach described below is free of the limitations imposed by the 'falling particle' architecture.

In one example the heating surface of the thermal energy storage system is provided in a thermal receiver which is configured to hold microparticles.

The at least one optical-fiber of the thermal energy storage system is arranged to transport sunlight from a solar collection apparatus at a collection location to the thermal energy storage system, wherein the thermal energy storage system is located at an energy conversion location remote from the collection location. In this context, 'remote from' may mean a location separated by as little as 0.5 meter or by more than 1 km.

The thermal energy storage system may comprise at least one cold particle storage tank for holding microparticles prior to heating, the cold particle storage tank being arranged with respect to the heating surface to supply the microparticles to the heating surface for heating. The thermal energy storage system may also comprise a hot particle storage tank arranged to receive heated microparticles after they have been treated on the heating surface.

An ideal particle storage vessel should be designed to minimize its surface-to-volume ratio for a given storage capacity. The objective of such a design is to reduce, as much as possible, the external surface of the vessel through which radiative heat losses could be suffered, while maximizing the particle storage capacity of the vessel.

To enable use of a gravity feed, the cold particle storage tank may be arranged in an elevated position with respect to the heating surface, and the system may comprise a downwardly extending conduit to guide microparticles from the cold particle storage tank to the heating surface.

The thermal receiver in the thermal storage system may comprise an inlet valve arranged to control ingress of microparticles into the thermal receiver for heating on the heating surface. The thermal receiver may additionally comprise an outlet valve configured to control an outflow of heated particles from the thermal receiver.

A controller in the thermal storage system may be provided to generate control signals for controlling at least one of the inlet valve and the outlet valve of the thermal receiver based on the heating of the microparticles.

The thermal energy storage system may comprise a temperature sensor which senses the temperature of the heated particles. The temperature sensor may be connected to a controller to provide a temperature signal which influences the operation of the controller.

The hot particle storage tank of the thermal storage system may comprise multiple openings to receive heated particles from multiple heating surfaces.

The thermal energy storage system may also comprise a heat exchanger arranged to receive particles heated from the heating surface and to guide and hold the heated particles in a position adjacent to a heat exchange fluid to thereby heat up the heat exchange fluid. Additionally, a conveyance system may be configured to retrieve particles, which have conveyed their heat to the heat exchange fluid in the heat exchanger, back to the heating surface for reheating.

The conveyance system of the thermal energy storage system may be arranged to convey particles, which have conveyed their heat to the heat exchange fluid, to the cold particle storage tank. In one example the conveyance system comprises an inclined screw conveyor.

The heat exchange fluid used in the heat exchanger of the thermal energy storage system can be water. The system may comprise a turbine arranged to be driven by the heated up water in the form of steam.

The thermal receiver of the thermal energy storage system may be partitioned into thin parallel compartments, each compartment respectively providing one of the heating surfaces onto which particles flow in a laminar fashion.

In the thermal energy storage system of the present aspect the means for causing relative movement between the optical fiber and the at least one heating surface can be implemented as a support to which the at least one optical fiber is fixed with its exit tip oriented to direct its beam onto a volume of the microparticles on the heating surface, wherein the support is driven by a drive mechanism for causing the relative movement to direct the beam onto the different volumes of the microparticles. In one embodiment, the drive mechanism is a motorized belt. Many other drive mechanisms may be suitable.

The thermal energy storage system may comprise a hopper to temporarily receive heat storage particles which have conveyed their heat to the heat exchange fluid prior to their return to the heating surface.

According to another aspect there is provided a method of storing thermal energy comprising the use of light transported in at least one optical-fiber to heat microparticles arranged on at least one heating surface by moving the optical-fiber tips relative to the volume of the microparticles to enable the optical-fiber tips to scan over the microparticles. The optical-fiber tips scan back and forth over the microparticles on the heating surface multiple times until a predetermined temperature of the microparticles has been reached.

Embodiments of the invention provide a method to convert sunlight to thermal energy, which can be more readily stored for later use and conversion to electricity. The method utilizes microstructured particulate matter, which plays the role of the heat transfer fluid, as well as that of the thermal storage medium.

Flow of granular particles, with physical dimensions in the range of several tenths of millimeters to several millimeters, through finite orifices requires that one pay particular attention to the relationship between the particle size and the size of the orifice. This is because under certain circumstances, the particle dynamics may cause the flow to abruptly halt or jam. Whether this happens or not depends on the ratio of the diameter of the orifice to the average diameter of a particle, and the angle or slope of the surface leading to the orifice through which particles leave a container or vessel. Below a certain critical ratio the likelihood of jamming is high; it becomes unlikely for ratios above the critical value. Jamming tends to happen when the diameter of the orifice is only several times larger than the typical size of a particle; it is unlikely when the orifice is several orders of magnitude larger than the size of a typical particle. It is generally known that the discharge of granular particles through an orifice, when such flow is enabled by gravity as is the case in this invention, depends on several empirical parameters that implicitly account for the coefficient of friction between the particles, the type of particles and their associated geometry, and the angle subtended at the conical section of the vessel where it abuts the pipe through which the particles flow. Particle flow rate is generally proportional to the ratio of the diameter of the orifice to the average particle size (raised to a power greater than two) and is fairly independent of the height of the column of particles in the vessel, except for when the column is much smaller than the diameter of the orifice. In the thermal energy storage application envisioned in this invention, the size of vessels and the sizes of related orifices through which particles flow are many orders of magnitude larger than the average size of a particle. This means the physical effects that could cause particle jamming will not occur as the dimensions and shapes of pipes at interfaces with the vessel and the topographic configuration for gravity-enabled flow are optimized to avoid this eventuality.

For a better understanding of the present invention, and to show how the same may be carried into effect, reference will now be made by way of example to the accompanying drawings.

BRIEF DESCRIPTION OF THE DRAWINGS

FIGS. 3A and 3B illustrate a thermal receiver;

DETAILED DESCRIPTION

In the following description a thermal energy storage system is described wherein the thermal energy derived from sunlight delivered to the storage facility via fiber-optic cables 410 which are attached to a solar collection apparatus of the type described below with reference to FIGS. 1A and 1B. Whilst examples are given herein of the use of sunlight as the energy source, it will readily be appreciated that other sources may also be appropriate, such as, for example, laser light or high intensity lamps. The storage system comprises a replaceable and upgradable cold particle storage tank for accommodating heat storage micro particles which play the role of heat transfer fluid as well as that of thermal storage media. The storage tank is installed with its axis aligned along the horizontal. A thermal receiver comprises an input pipe for transferring particles from cold particle storage to the receiver at a rate controlled by a rotary inlet valve. The valve connects the cold particle storage to an oven for heating the particles. The oven is partitioned into thin parallel compartments through which particles flow in a laminar fashion. A fiber-optic scanning mechanism attached on top of the oven constitutes part of the receiver. The scanning mechanism (scanner) is equipped with a motorized belt system to permit back and forth motion of the fiber tips deployed over the oven. An outlet pipe is provided for transferring hot particles at a rate controlled by an outlet rotary valve to a common duct connected to a combined hot particle storage and thermal exchange system. A programmable logic controller synchronizes and controls the opening and closing of the particle inlet and outlet rotary valves.

The system comprises a replaceable and upgradable hot particle storage tank with varying volume requirements with capacities typically varying from 1 to 150 kilotons, or higher. The capacity of the hot particle storage tank 1104 may vary in line with the capacity of the cold particle storage tank according to the volume of microparticles that need to be stored to achieve the required energy storage capacity (defined as a specific number of hours of thermal storage with a specific level of electrical output (kWh/MWh), at a specific net power block percent efficiency). The lid of the tank has openings to receive hot particle outlet pipes that originate from one or multiple thermal receivers. The storage tank is installed with its axis aligned along the horizontal.

The system has a heat exchange vessel with a typical capacity of between 1 to 20 kilotons, or higher. The capacity of the heat exchanger vessel may vary according to the required energy storage capacity of the hot particle storage tank 1104 and the required particle output volume. This vessel is a tall cylindrical tank with a diameter between 15 and 20 meters or wider and a height between 60 meters and 120 meters or higher, installed with its axis perpendicular to the horizontal. It is provided with a coiled copper pipe with an inlet and outlet for cold water and steam, respectively. The heat exchanger is further provided with inlet and outlet ports and associated rotary release valves. A rotary release valve sits at the top port to the vessel and at the bottom of it.

Another component of the system is a hopper with a cover. The hopper is connected with a pipe to the lower chamber of the heat exchanger through the bottom rotary release valve. Below the hopper is a programmable logic controller for setting control signals for opening and closing of the rotary valve between the upper hot particle entry chamber and the lower heat exchanger chamber. The programmable logic controller also controls the opening and closing of the rotary valve between the hopper and the lower heat exchange chamber.

An inclined screw conveyor system is connected to the closed hopper. The screw conveyor receives particles from the lower heat exchanger chamber through the hopper and delivers them (against gravity) to the cold particle storage tank. The screw conveyor is controlled by the programmable logic controller under the hopper. At the top of the cold storage tank, the screw conveyor delivers the particles to an internal pipeline that distributes them along the entire length of the cold storage tank through valve-controlled openings along its length. This enables even particle distribution inside the cold storage tank.

A power block, which in one possible embodiment may be comprised of a steam turbine generator, boiler feed water pump and an air-cooled condenser, is connected to the heat exchanger through the upper chamber of the heat exchanger. The power block is connected via the steam pipe outlet at the upper chamber of the heat exchanger.

This overall system provides a natural or designed topographic scheme wherein the cold particle storage tank is installed at a higher elevation than the building shed housing the thermal receivers. This topographic scheme permits use of gravitational potential to deliver particles to the thermal receivers. Because a similar relationship exists between the closed hopper and the cold particle storage tank, an inclined screw conveyor is used to deliver used particles (against gravity) back to the cold particle storage.

The above components of the system will be described in more detail, after a description of harvesting the sunlight and coupling it to the optical fibers has been provided.

Figure 1:
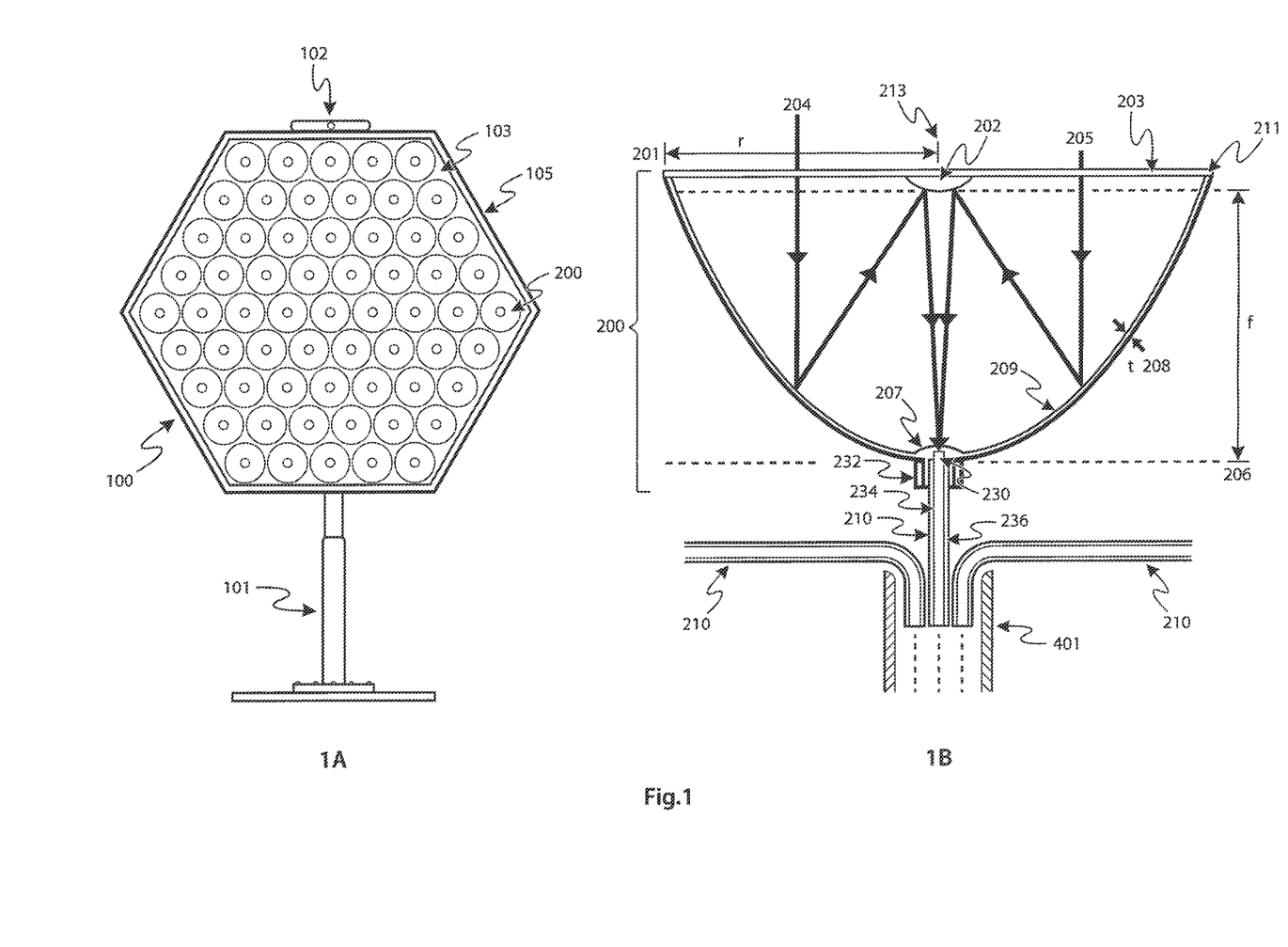
FIG. 1A shows an array of solar collector modules for harvesting sunlight at a collection location.
FIG. 1B is a sectional view through a solar collector module.

FIGS. 1A and 1B illustrate a solar collection system which comprises one or more arrays 100 of solar collector modules 200. Each solar collector module is dish-shaped and acts to receive sunlight rays 204, 205 from its upper flat or open surface and to direct that sunlight using optical components to a light receiver 210 located at the lower central region of the dish. In the described embodiments, the light receiver 210 is a fiber-optic waveguide 210. The fiber-optic waveguides 210 from each solar collector module in the array can be collected together and housed in a fiber-optic cable 401 for each array. The fiber-optic cables are then collected together and housed in a 'super' fiber-optic cable 413. The fiber-optic waveguides provide a point light source, which has a defined and homogeneous light beam area, having a strong illumination focus, producing a sharply defined and evenly lit luminous spot. In a point source, the area from which the light emanates must not be large, i.e. must not form an 'extended source', since an extended source has different characteristics that make it work without having to integrate optics to pre-shape the beam profile.

In the present description, the term optical-fiber is used interchangeably with fiber-optic waveguide to denote a long cylindrical silica glass core surrounded by a cladding whose index of refraction is smaller than that of the core. The cladding in turn is surrounded by a protective polymer coat. The entire structure is encapsulated in a hard but flexible protective outer polymer layer called the jacket. The term fiber strand is used herein also to denote a single optical-fiber waveguide. The phrase 'optical-fiber (or fiber-optic) cable' is used to denote a tough but flexible protective thermoplastic housing with multiple optical-fibers for the purpose of light transport. Multiple cables may be housed in a single 'super cable' sheath for transporting over long distances.

The revolutionary arrangement described herein thus enables sunlight to be collected at a location where sunlight is plentiful (a collection location), and transported to a location separated from the collection location. The distance of separation could be small or large, and is limited only by the possible length of fiber-optic cables and any absorption losses, per unit length, that may reduce the amount of sunlight along its path. For example, the transport distance may be in the range from less than 0.5 m (but >1 cm) or greater than 1 km. As is known in the field of optical communication, optical-fiber cables may be connected together end to end to increase the distance. Once coupled into fiber-optic waveguides, sunlight can be transported safely by routing the fiber-optic cables housed in the 'super' cables to any desirable location where the sunlight energy can be further processed or manipulated into a desired form (electrical or thermal). The distance over which sunlight might be transported can be as short as tens of meters away from where it is collected, or the distance can span a city, a country or even a continent as long as most fiber absorption losses and coupling losses can be minimized.

The embodiments of the invention described herein thus introduce a radical approach that separates the process of harvesting sunlight from its immediate utilization or conversion to other forms of energy. Instead of the integrated approaches which have been developed in the past, the present approach separates the processes involved in solar energy harvesting and the use of that energy.

FIG. 1A shows an assembly of paraboloid solar collector modules 200 in an array 100 on a supporting surface 103 which is mounted on a pedestal 101. The pedestal 101 has a rack 105 on which the hexagonal collector array 100 is mounted. To follow the daily movements of the sun, the collector array 100 is provisioned with a two-axis, motor-driven (not shown) system for positioning and pointing the entire structure to the most optimal direction for collecting the most sunlight at any time during a sunny day. A solar tracking sensor 102 provides a control signal for driving a programmable logic controller [not shown] that controls the two-axis tracking system. Details of the two axis tracking system and the programmable logic controller are not described further herein, because there are known systems which are currently used to control the angle of orientation of solar panels which could be adapted for this purpose. The individual collector modules can be arranged in the array in any two-dimensional geometric shape desired. However, the arrangement in this embodiment is such that the final geometric form, when looked at from a plan view, is a hexagon. This arrangement is preferred in some contexts because it is predicated on a geometric optimization principle that produces a hexagon as the ideal geometric form for the highest packing density (per unit area) for arranging dish-shaped, concave structures with circular rims, resulting in an effective surface coverage of about 91%.

Each collector module 200 may be designed to securely fit inside a holding substructure 103 in a manner to allow simple removal and replacement. Alternatively, a complete array of collector modules can be fabricated as a single structure which can easily be removed and replaced from the rack 105.

A single collector module 200 is shown in FIG. 1B. The collector module 200 is a hollowed-out paraboloid dish formed from an appropriately truncated parabola that is rotated about its origin. The dish has a focal length f 206 measured from a point 213 at the center of the circular upper area of the dish along the central axis, to a collection region 207 at the surface of the dish. In one embodiment the paraboloid collector module 200 is designed to have the radius r 201 of its circular rim 211 be exactly equal to the focal length f 206 of the dish, but in other embodiments it is possible that the radius of the circular rim does not necessarily have to be equal to the focal length. Such a structure can be easily manufactured by casting from a single paraboidal mold. Alternatively, a large array of them arranged in the shape of the designed collector array 100 of FIG. 1A could be made in a single mold. The thickness t 208 of the wall of the collector module 200 may be minimized for any specific material out of which the module is made, subject to certain trade-offs mentioned below. For polymeric glass materials, such as poly-methyl-methacrylate (PMMA), also known as acrylic glass, it can be as thin as a few millimeters. The exact thickness can be chosen as an engineering trade-off between mechanical robustness and the weight of a single collector module (or array of modules). If it is too thin, it could be susceptible to damage from handling or ambient turbulence, but if it is too thick and therefore heavy, it could contribute too much weight to the total weight of the collector array 100. The total weight of the collector array 100 should directly balance a need for structural robustness and a requirement for low power for operating the tracking systems that control the alignment and pointing of the array 100 to the optimum position of the sun. For an array made from acrylic glass material, a thickness of 1 mm for the module material would be ideal; this would result in the weight of a single, completely sealed collector module being 41.56 grams if the external rim diameter is 15 cm, and its internal rim diameter is 14.9 cm. For this illustrative example, we have taken the radius of the module to be equal to its focal length. The weight of 64 such collector modules would be about 2.66 kg (assuming a density of grams/cm$^3$ for PMMA).

While a paraboloid collector module 200 is described herein, it will readily be appreciated that different shapes may be utilized. What is required is a collector module that is capable of receiving solar radiation, including optical components that guide the solar radiation to a light receiver in the form of an optical-fiber. In the present embodiment, a concave collection surface is provided that is reflective and configured to collect sun rays and to reflect them towards a location at which a mirror is mounted. The mirror receives sun rays reflected from the collection surface and redirects them to a light collection point where a light receiver such as an optical-fiber can be coupled. Any shape which satisfies these criteria, with any suitable optical guiding components may be utilized in accordance with the principles described herein.

In the embodiment described herein the solar collector apparatus comprises collector modules which utilize reflection to collect and guide the sunlight onto the light receiver. Once the principles of separately harvesting the sunlight at a collection location, and guiding it using optical fibers to a utilization location are understood, it will readily be appreciated that other alternatives may be available for collecting the sunlight. For example, sunlight may be collected using refractive rather than reflective optics. Refractive optics involves use of lenses alone. It would be possible to use arrays of convex lenses or Fresnel lenses to focus the light to a point where a fiber can be placed to capture it. Having said that, there may be advantages to utilizing reflective optics. Achieving the right precision on a large array of lenses featuring refractive optics may be harder than achieving the same precision using mirrors. Furthermore, some lenses have a defect called 'chromatic' aberration that may be unavoidable, while mirrors do not suffer from this. Another important consideration is weight. Conventional lenses need to have a thickness to refract light, which adds weight. A mirror on the other hand may be as thin as required. Unless, however, the lens is a meta-lens, which may be comprised of microscopically engineered surface features that permit fabrication of a flat lens for focusing light of a certain wavelength band; full spectrum meta-lenses are still challenging to fabricate To enhance proper functioning, the concave inner lining of each module 200 in the collector array 100 should desirably be coated with a broadband high reflectivity film 209 or stack of films. The reflectivity for the inner lining 209 for each module 200 in the array should be 100% for sunlight wavelengths spanning the spectral range from 350 nm to 2500 nm. Most energy (about 95%) from the sun reaching the earth is concentrated within this spectral band. The energy is distributed non-uniformly in the solar spectrum. It is estimated that about 4% is contained between 300 nm and 400 nm; 42% between 400 nm and 700 nm, and 52% between 700 nm and 2500 nm. In a fully assembled collector array, each module 200 in the array has a thin transparent glass cover 203 extending over the open area defined by the rim 211 of the dish; this may be made from lightweight, durable, and ultraviolet-resistant plastic material. The cover 203 serves the dual role of protecting the concave inner lining 209 of the module from the elements as well as acting as an input port for parallel incident solar radiation rays 204 and 205 into the collector module. Solar radiation rays, such as 204 and 205, are reflected from the inner lining 209 and, because of the particular parabolic curvature of the module, redirected toward the focal point 213 of each dish in the vicinity of the center of the cover glass. A perfect hyperboloid mirror reflector 202, attached to the center of the cover 203 and positioned in the vicinity of the dish focal point, retro-reflects and refocuses the light to the bottom of the dish to the collection region 207, below which is attached a fiber-optic waveguide 210 with an appropriate numerical aperture. Here, numerical aperture is defined as a dimensionless parameter that characterizes the range of angles of incident sunlight rays that are successfully captured by the fiber and are thus readily transported along its length.

The fiber-optic waveguide 210 may be attached by any suitable mechanism. In one embodiment, a screw thread around a ferrule can be created at the fiber tip 230, and a corresponding threaded body 232 can be provided at the collection point 207 of the collector module such that the tip 230 of the fiber-optic strand can be screwed into the threaded region at the bottom of the module. Technology for securing optical-fibers to curved and planar surfaces is known and may be adapted for use herein.

The fiber-optic waveguide 210 may have a circular cross-section core waveguide 234 whose diameter may range from 100 microns to 1 millimeter and whose cladding thickness can range between 150 microns and 1 millimeter. It will readily be appreciated that other dimensions may also be appropriate, depending on the context. In some examples, a fiber-optic waveguide for a single collector module could be capable of transporting a minimum of 10 W of sunlight for a distance of at least 1 km with minimal loss (<10 dB/km) over most of the spectral band in which the majority of solar energy is contained. Greater distances may be enabled depending on the context. Over the majority of the spectrum, the loss should be below 5 dB/km. For good performance and to maximize efficiency, the fiber-optic waveguides 210 should exhibit broadband transmission of sunlight beginning from the wavelength of 350 nm and ending at the wavelength of 2500 nm. The inventor has recognized certain spectral features of sunlight when considering the transportation requirements which have not hitherto been studied in depth; they have recognized that it is desirable that the sunlight transmission capability of the fiber between the wavelengths of 350 nm and 450 nm be greater than 20%, and between 450 nm and 700 nm, it should be greater than 85%, and between 700 nm and 1700 nm it should be 90% or greater, except for a narrow band of about 20 nm centered around the atmospheric water vapor absorption line at the wavelength of 1430 nm, where the transmission may dip to almost zero. This dip is of no consequence because there is little to no incident solar radiation at this wavelength due to atmospheric absorption of sunlight. The inventor has also recognized that this is because the same absorption mechanisms (water molecules and hydroxyl ions) in the atmosphere are also present in the manufacture of glass fibers (from humidity in the air). Between the wavelengths of 1450 nm and 1900 nm, the fiber transmission should preferably be greater than 85%, and between 1900 nm and 2000 nm, it should preferably be better than 30%. For the remainder of the solar spectrum between 2000 nm and 2500 nm, the fiber transmission is expected to be between 15% and 20%. Low transmission in the last spectral region should not be a problem because the amount of solar energy carried in this portion of the spectrum is less than 1%. The critical aspect is that the spectral transmission characteristic of the fiber should closely follow the distribution of solar energy reaching the earth as described above. This means that where there are dips in the solar energy spectrum reaching earth, the fiber may have similar dips in transmission since there is little energy to transmit. Overall, however, the delivery of sunlight through a fiber-optic waveguide should incur very little loss of light, certainly no more than 10 dB/km at worst but below 5 dB/km at best, over the spectral band in which most solar energy is contained.

Figures 3, 3B:
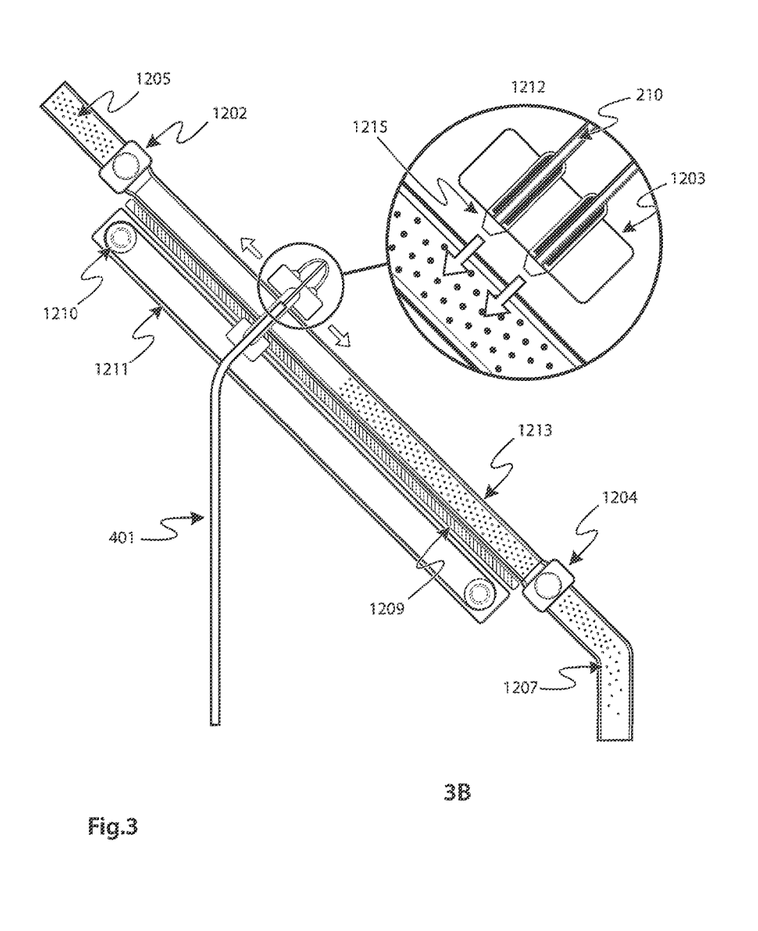
Figure 4:
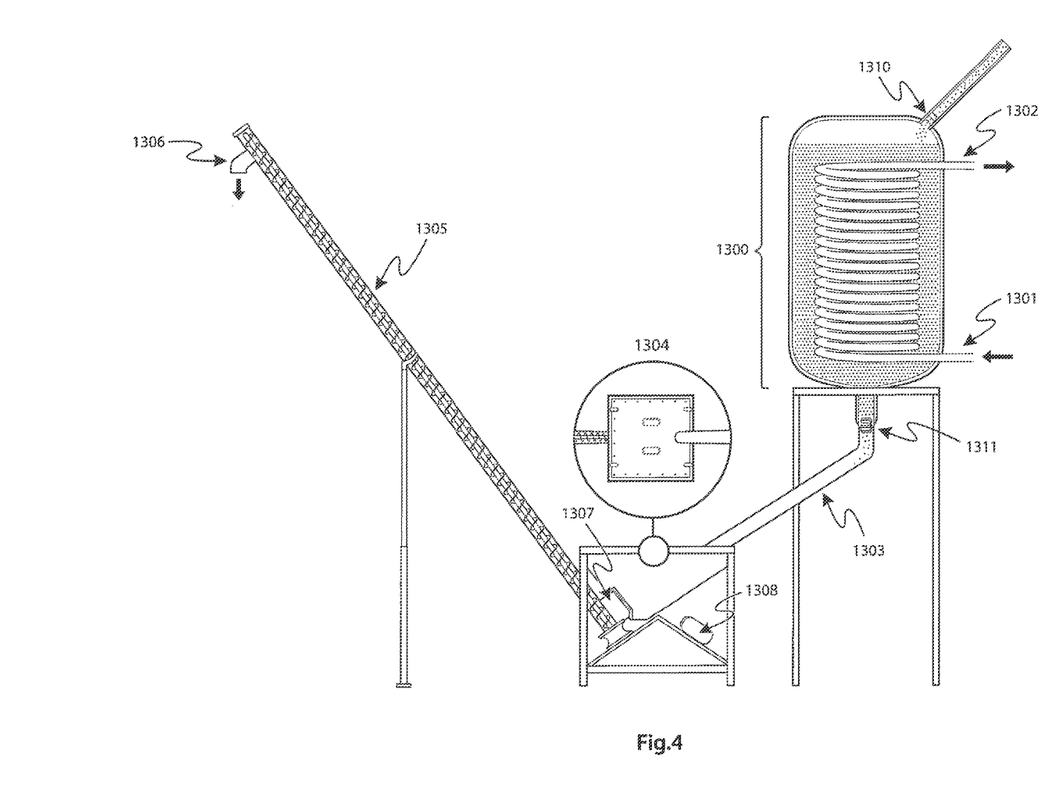
FIG. 4 illustrates a heat exchanger.

One application of the solar collection and transportation system is the transfer and storage of solar energy in the form of heat. Reference will now be made to FIGS. 3A, 3B and 4 to describe a method and system for heat storage and conversion.

The method described herein uses solid matter as heat storage and heat exchange medium. The method utilizes microstructured solid-state particles, having high thermal absorption and low emissivity properties. High absorption means the particles can be rapidly heated to very high temperatures, and the low emissivity, means that the particles can retain the heat longer.

The microparticles that can be used as storage media and heat transfer media for the system described herein can have any chemical composition, as long as they possess heat capacities above 700 J/kg ° C. Examples of suitable particles include, but are not limited to, (i) silica sand, (ii) quartz sand, (iii) alumina, (iv) silicon carbide, (v) graphite pebble, and (vi) proppants. These materials are all abundant and inexpensive. Of these, proppants, such as used in hydraulic fracturing treatment, are the preferred media for having the most suitable physical properties for thermal energy storage applications, since their physical properties, especially their geometry, can be precisely controlled. Ceramic proppants have the most suitable physical properties for thermal energy storage applications because they can be precisely engineered. The preferred size distribution for the particles used can range from 100 μm to 2 mm. It will be readily appreciated that other particle size distributions may also be appropriate, depending on the context.

The use of microparticles avoids the disadvantages of heat transfer fluids currently utilized in thermal storage. Molten salt has usually been the heat transfer fluid of choice in such systems because of its high heat capacity. However, most salts are corrosive, thus subjecting any vessel, piping, and pumping system used in the construction of the power plant to unnecessary damage. Frequent maintenance to replace corroded components results in long down times and high annual maintenance costs.

Figure 2:
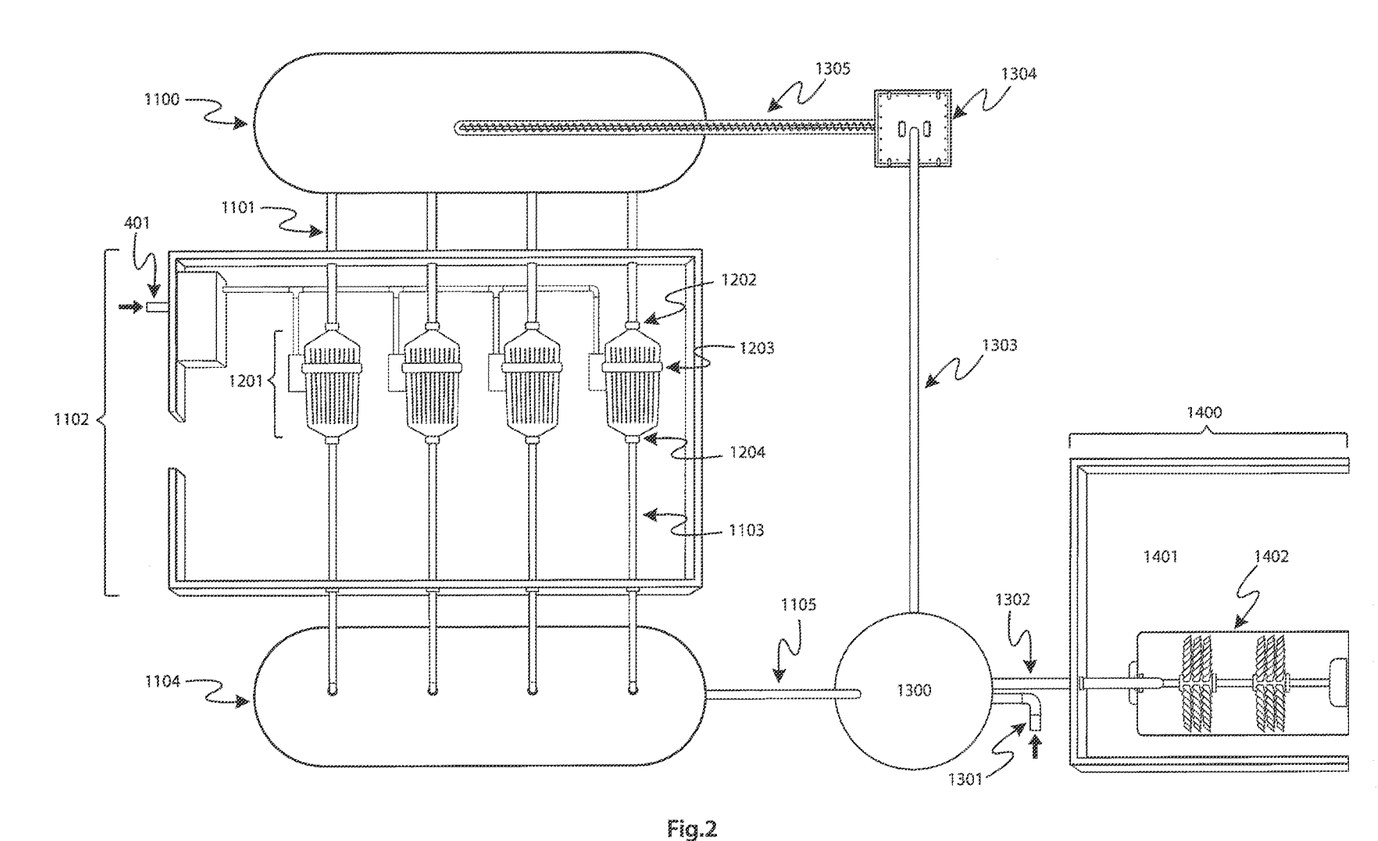
FIG. 2 is a schematic view of a thermal energy storage system.

FIG. 2 shows an overview of the solar thermal platform plant having the microparticles. Cold microparticles are stored in a storage tank 1100, which is used to feed a heating system or light processing center 1102, where the microparticles are fed in batches and heated using sunlight. The cold particle storage tank 1100 may be of different volumes in order to accommodate particles with capacities varying from 1 to 150 kilotons, or higher. The capacity of the cold particle storage tank 1100 may vary according to the volume of microparticles that need to be stored to achieve the required energy storage capacity (defined as a specific number of hours of thermal storage with a specific level of electrical output (kWh/MWh), at a specific net power block percent efficiency). The cold particle storage tank 1100 is positioned with its axis in a horizontal orientation, and is installed in an elevated configuration with respect to the other units of the system to facilitate the microparticles being transferred to the light processing center 1102 by gravitational potential through several feeding pipes 1101, thus conserving process energy. The microparticles are stored in the cold particle storage tank 1100, which can be easily replaced and upgraded when needed. The light processing center receives microparticles from the cold particle storage tank 1100 and holds them in at least one heating surface in a thermal receiver 1201.

The sunlight used to heat the microparticles is delivered to the system via a 'super' fiber-optic cable 413 having multiple fiber-optic cables 401. The 'super' fiber-optic cable 413 is connected to the system via the light processing center 1102, where at least one thermal receiver 1201 having a heating surface is housed. Light transported by the fibers 210 is aggregated from a number of solar collectors 100 that may be located near or remotely from the light processing center 1102. The solar collectors 100 are not shown in FIG. 2 for reasons of clarity. The at least one thermal receiver 1201 installed in the light processing center 1102 is provided with a fiber-optic scanner 1203 that is connected to the fiber-optic cable 401, and which is responsible for heating the microparticles fed into the thermal receiver 1201. Attached to each thermal receiver 1201 is an input and output microparticle port, controlled, respectively, by rotary gate valves 1202 and 1204. The structure of the thermal receiver and its different parts will be explained in more detail in the description of FIGS. 3A and 3B below.

The output pipes 1103 of the at least one thermal receiver 1201 having a heating surface are connected to multiple openings on the lid of a hot particle storage tank 1104, which stores the heated microparticles that will then be used to feed a heat exchanger 1300. The hot particle storage tank 1104 may be of different volumes in order to accommodate particles with capacities typically varying from 1 to 150 kilotons, or higher. The capacity of the hot particle storage tank 1104 may vary in line with the capacity of the cold particle storage tank 1100 according to the volume of microparticles that need to be stored to achieve the required energy storage capacity (defined as a specific number of hours of thermal storage with a specific level of electrical output (kWh/MWh), at a specific net power block percent efficiency). The hot particle storage tank 1104 is positioned with its axis on a horizontal orientation, and is placed at a level which is lower with respect to the light processing center 1102 to facilitate the microparticles being transferred from the light processing center 1102 to the hot particle storage tank 1104 by gravitational potential through the output pipes 1103.

The hot particles are delivered to a heat exchanger 1300 by a hot particle transfer pipe 1105. Once the microparticles are delivered, the heat exchanger 1300 takes in cold water from a water inlet 1301. Inside the heat exchanger 1300, particles transfer their thermal energy to the cold water to produce steam that is delivered to the power block 1401, where it is used to drive a steam turbine generator 1402 to generate electricity inside a utility unit 1400. Particles exit the heat exchanger via a pipe 1303 with little to no thermal energy left. They are delivered through a hopper 1304 to either an inclined screw conveyer system 1305 or other form of conveyor system. At this point, the temperature of the particles should be close to room temperature or the ambient, and can be re-delivered to the cold particle storage tank 1100 where they can be reused in the system. The cycle begins anew once the particles are back in the cold particle storage tank 1100. The heat exchanger 1300 and the different components of the hopper and inclined screw will be described in more detail in the description of FIG. 4 below.

FIG. 3A shows the front view with details of the component parts comprising the solar thermal receiver 1201, which resides inside of the light processing center 1102. Cold particles enter the thermal receiver through a rotary valve 1202 connected to the top of the thermal receiver, and which is positioned after a pipe piece 1205 that connects the cold particle storage tank 1100 with the thermal receiver 1201.

The thermal receiver 1201 is partitioned into several, thin and parallel hollow sections 1206 that promote laminar flow of particles through it. Because of the inclined positioning of the receiver (as shown in FIG. 3B, and described in more detail below), particle flow is facilitated by gravity.

Sunlight energy is delivered to the fiber-optic scanners 1203 from the fiber optic cable 401. The fiber-optic cables 401 are separated into individual fibers 210 that are distributed along the surface of the fiber-optic scanners 1203, and are attached to a series of light delivery heads 1212 that terminate in a fiber tip 1215 which is directed at the heating surface of the thermal receiver 1201. The enclosure 1213 of the thermal receiver 1201 containing the particles is composed of a semitransparent ceramic material that enables energy transfer from the fiber tip 1215 to the microparticles retained inside the thermal receiver 1201. This enclosure can be made from any ceramic material with good thermal properties, such as, but not limited to silicon carbide; boron nitride; beryllium oxide and aluminum nitride. The preferred material for use in the heating surface of the thermal receivers 1201 is pyrolytic boron nitride, for its high thermal conductivity and transparency. Each thermal receiver 1201 is partitioned internally into separate parallel sections where particles can flow in laminar fashion by gravitational potential toward the bottom rotary valve 1204. When a thermal receiver 1201 is filled with particles, they are constrained to remain in the thermal receiver 1201 for as long as the bottom rotary valve 1204 is closed. The fiber-optic scanner 1203 moves continuously up and down the heating surface of the thermal receiver 1201, uniformly heating the particles for as long as needed, until the desired temperature is reached. The temperature of the particles is measured by a sensor 1208, which determines how long the particles will remain inside the thermal receiver 1201. Once the desired temperature of the particles has been reached, the sensor generates a signal that activates the rotary gate valve 1204 to allow the heated particles to flow to the hot particle storage tank 1104. Using a controller, such as a programmable logic controller (PLC), the act of closing and opening the rotary gate valve 1204 can be synchronized with the opening and closing of the rotary release valve 1202 to enable the thermal receiver 1201 to be replenished with cold microparticles as soon as the heated microparticles are released. The temperature of the microparticles in the present system can be elevated to whatever value is deemed necessary within the thermal limitations of the material used for the microparticles. Furthermore, since the system heats the microparticles in batches, there is no need for particle recirculation during the heating process.

FIG. 3B shows a side view of the thermal receiver, providing more details of the mechanism used to effect scanning of the fiber delivery tip 1215 over the surface of the thermal receiver 1201. A digital motor 1210 is coupled through a belt 1211 to a hub near the rotary valve 1204. The fiber delivery head 1212 comprising the fiber-optic scanner 1203, the fiber optic distribution cable 210 and the fiber tip 1215, is attached to the belt 1211 in such a manner that as the belt 1211 moves back and forth, it carries the fiber head 1212 with it. In this way the heating surface of the thermal receiver 1201, and hence the particles inside it, are uniformly heated. Another perspective of the light delivery fibers in the scanner is shown in the enlarged view of the light delivery head 1212, where is shown how the fibers 210 are attached. The fibers 210 can be attached to the fiber-optic scanner by any suitable mechanism, such as a screw thread on the fiber tip, which connects to a thread on the fiber-optic scanner 1203. Any other known technology available for connecting optic-fibers to surfaces can be used herein. Note that the fibers are terminated with tips 1215 that properly shape the beams before incidence on the oven surface. The thickness of the thin sheet formed by the particles inside the oven with a minimum thickness of a millimeter, in order to allow for a limited number of microparticle layers to be formed in each thermal receiver 1201 for each batch, to allow a more uniform temperature to be reached throughout the different particle layers during the heating process. Placed behind the heating surface of the thermal receiver 1201, is a thermal reflector 1209 that retro-reflects any heat that is not absorbed in the first pass by the microparticles.

Once heated to the required temperature, the temperature sensor sends a signal to the rotary gate valve 1204 that releases the hot particles, which are conveyed to a hot particle storage tank 1104. The hot particle storage tank 1104 is positioned at a lower elevation with respect to the thermal receiver 1201 and the pipe 1207 that delivers the hot particles from the thermal receiver 1201 to the hot particle storage tank 1104 so that gravitational potential can be utilized to convey the particles.

One of the important consequences of using microparticles as the heat transfer media as well as the storage media is the enabling of a high temperature regime of operation. By nature, microstructured particles exhibit relatively high surface-to-volume ratios that are conducive to higher heat transfer properties compared to bulk media. This means operating temperatures of up to 800° C. or higher are potentially feasible. Since the Carnot efficiency of a heat plant depends on the temperature difference between the highest attainable temperature of the working fluid (medium) and the ambient temperature, the proposed approach would lead to much higher solar-to-electric conversion efficiencies compared to existing systems.

The system presented herein for thermal energy storage minimizes parasitic energy usage, as it does not require use of additional process energy to keep the media in a (molten) liquid state. Plant process energy usage is parasitic and reduces overall plant output.

FIG. 4 illustrates the path taken by the particles after they leave the hot particle storage tank 1104 and arrive at the heat exchanger 1300 via the hot particle transfer pipe 1105, connected to the heat exchanger 1300. The heat exchanger 1300 is formed by a vessel having a cylindrical shape and positioned at a lower height with respect to the hot particle storage tank 1104 to facilitate the transfer of the particles by gravity. The vessel, having a typical capacity for 1 to 20 kilotons, or higher, is installed with its axis perpendicular to the horizontal. The capacity of the heat exchanger vessel may vary according to the required energy storage capacity of the hot particle storage tank 1104 and the required particle output volume. The heat exchanger 1300 is provided with a coiled copper pipe positioned inside the vessel, having an inlet 1301 and outlet 1302 for cold water and steam, respectively. The heat exchanger 1300 is also provided with two rotary release valves, one installed at the top of the vessel 1310 that controls the transfer of hot particles from the hot particle storage tank 1104 and another installed at the bottom of the vessel 1311 for release of the cold particles to the sealed hopper 1304. It is in the heat exchanger that the thermal energy stored in the particles is transferred to cold water that is converted to steam. The hollow copper coil occupying most of the volume inside the vessel of the heat exchanger 1300 serves as the piping that lets cold water into the heat exchanger 1300 through a port 1301, where it is heated and converted to steam. The outlet 1302 of the copper coil, which should now contain steam, is fed into the power block 1401 to drive a steam turbine generator 1402. After heating the water in the coiled copper pipe, the particles exit the heat exchanger 1300, exhausted of their thermal energy, and through a rotary release valve 1311 are then conveyed through a pipe 1303 to a sealed a hopper 1304. The sealed hopper is installed at a height lower than the heat exchanger 1300 to allow the particles to be transferred by gravity from the heat exchanger 1300 to the hopper 1304. Installed in the hopper 1304 is a mechanism for feeding the particles to a screw conveyer system 1305 that moves the particles against gravity to feed them back to the cold particle storage tank 1100. The screw conveyer system 1304 is inclined at an angle between 30° to 60° to the horizontal to facilitate connection to the cold particle storage tank 1100 through a pipe 1306. The screw conveyance system is driven by motor 1307, which is installed at its base. An associated control box 1308 is located underneath the hopper.

The proposed implementation of thermal energy storage has a number of benefits. First, the approach adheres to a principle of minimization of process energy usage. As much as possible, gravity has been used to aid processes that would otherwise require energy expenditure. Unlike in prior art, the storage medium is not pumped around the circulatory loops. Second, the heat transfer and storage media in the proposed system are stable, widely available, inexpensive, chemically benign, and safe. The entire implementation is environmentally and economically sustainable.

The invention claimed is:

1. A thermal energy storage system comprising:
a heating surface arranged to support microparticles to be heated;
at least one optical-fiber arranged to transport light to illuminate the heating surface; and
means for causing relative movement between the at least one optical-fiber and the at least one heating surface to enable the microparticles to be heated by the transported light as the at least one optical-fiber scans the microparticles wherein the heating surface is provided in a thermal receiver which is configured to hold the microparticles.

2. A thermal energy system according to claim 1 wherein the at least one optical-fiber is arranged to transport sunlight from a solar collection apparatus at a collection location, wherein the thermal energy storage system is located at an energy conversion location remote from the collection location.

3. A thermal energy storage system comprising:
a heating surface arranged to support microparticles to be heated;
at least one optical-fiber arranged to transport light to illuminate the heating surface;
means for causing relative movement between the at least one optical-fiber and the at least one heating surface to enable the microparticles to be heated by the transported light as the at least one optical-fiber scans the microparticles; and
at least one cold particle storage tank for holding microparticles prior to heating, the cold particle storage tank being arranged with respect to the heating surface to supply the microparticles to the heating surface for heating.

4. A thermal energy storage system comprising:
a heating surface arranged to support microparticles to be heated;
at least one optical-fiber arranged to transport light to illuminate the heating surface;
means for causing relative movement between the at least one optical-fiber and the at least one heating surface to enable the microparticles to be heated by the transported light as the at least one optical-fiber scans the microparticles; and
a hot particle storage tank arranged to receive heated microparticles after they have been heated on the heating surface.

5. A thermal energy storage system according to claim 3 wherein the cold particle storage tank is arranged in an elevated position with respect to the heating surface, and the system comprises a downwardly extending conduit to guide microparticles from the cold particle storage tank to the heating surface.

6. A thermal energy storage system according to claim 1 wherein the thermal receiver comprises an inlet valve arranged to control ingress of microparticles into the thermal receiver for heating on the heating surface.

7. A thermal energy storage system according to claim 1 wherein the thermal receiver comprises an outlet valve configured to control an outflow of heated particles from the thermal receiver.

8. A thermal energy storage system according to claim 7 comprising a controller arranged to generate control signals for controlling at least one of the inlet valve and the outlet valve based on the heating of the microparticles.

9. A thermal energy storage system according to claim 4 wherein the hot particle storage tank comprises multiple openings to receive heated particles from multiple heating surfaces.

10. A thermal energy storage system comprising:
a heating surface arranged to support microparticles to be heated;
at least one optical-fiber arranged to transport light to illuminate the heating surface;
means for causing relative movement between the at least one optical-fiber and the at least one heating surface to enable the microparticles to be heated by the transported light as the at least one optical-fiber scans the microparticles; and
a heat exchanger arranged to receive particles heated on the heating surface and to guide and hold the heated particles in a position adjacent to a heat exchange fluid to thereby heat up the heat exchange fluid.

11. A thermal energy storage system according to claim 10 comprising a conveyance system configured to retrieve particles, which have conveyed their heat to the heat exchange fluid in the heat exchanger, back to the heating surface for reheating.

12. A thermal energy storage system according to claim 11 comprising at least one cold particle storage tank for holding microparticles prior to heating, the cold particle storage tank being arranged with respect to the heating surface to supply the microparticles to the heating surface for heating, and wherein the conveyance system is arranged to convey particles, which have given up their heat to the heat exchange fluid, to the cold particle storage tank.

13. A thermal energy storage system according to claim 11 wherein the conveyance system comprises an inclined screw conveyor.

14. A thermal energy storage system according to any of claim 10 wherein the heat exchange fluid comprises water, and the system comprises a turbine arranged to be driven by the heated up water in the form of steam.

15. A thermal energy storage system according to claim 1 wherein the thermal receiver comprises a container partitioned into thin parallel compartments, each compartment respectively providing one of the heating surfaces onto which particles flow in a laminar fashion.

16. A thermal energy storage system comprising:
a heating surface arranged to support microparticles to be heated;
at least one optical-fiber arranged to transport light to illuminate the heating surface; and
means for causing relative movement between the at least one optical-fiber and the at least one heating surface to enable the microparticles to be heated by the transported light as the at least one optical-fiber scans the microparticles,
wherein the means for causing relative movement between the optical-fiber and the at least one heating surface comprises a support to which the at least one optical-fiber is fixed with its exit tip oriented to direct its beam onto a volume of the microparticles on the heating surface, wherein the support is driven by a drive mechanism for causing the relative movement to direct the beam onto different volumes of the microparticles.

17. A thermal energy storage system according to claim 16 wherein the drive mechanism is a motorized belt.

18. A thermal energy storage system according to claim 8 comprising a temperature sensor which senses the temperature of the heated particles, the temperature sensor is connected to the controller to provide a temperature signal which influences the operation of the controller.

19. A thermal energy storage system according to claim 10 comprising a hopper to temporarily receive storage particles which have conveyed their heat to the heat exchange fluid prior to their return to the heating surface.

20. A method of storing thermal energy comprising:
transporting light in at least one optical-fiber to heat microparticles arranged on at least one heating surface provided in a thermal receiver which is configured to hold a volume of the microparticles; and
operating a support to move a tip of at least one optical-fiber relative to the volume of the microparticles to scan the optical-fiber tip over the microparticles.

21. A method according to claim 20 comprising scanning the at least one optical-fiber tip back and forth over the microparticles on the heating surface multiple times until a predetermined temperature of the microparticles has been reached.

22. A thermal energy storage system according to claim 3 wherein the heating surface is provided in a thermal receiver which is configured to hold microparticles.

23. A thermal energy storage system according to claim 4 wherein the heating surface is provided in a thermal receiver which is configured to hold microparticles.

* * * * *